Figure 1:
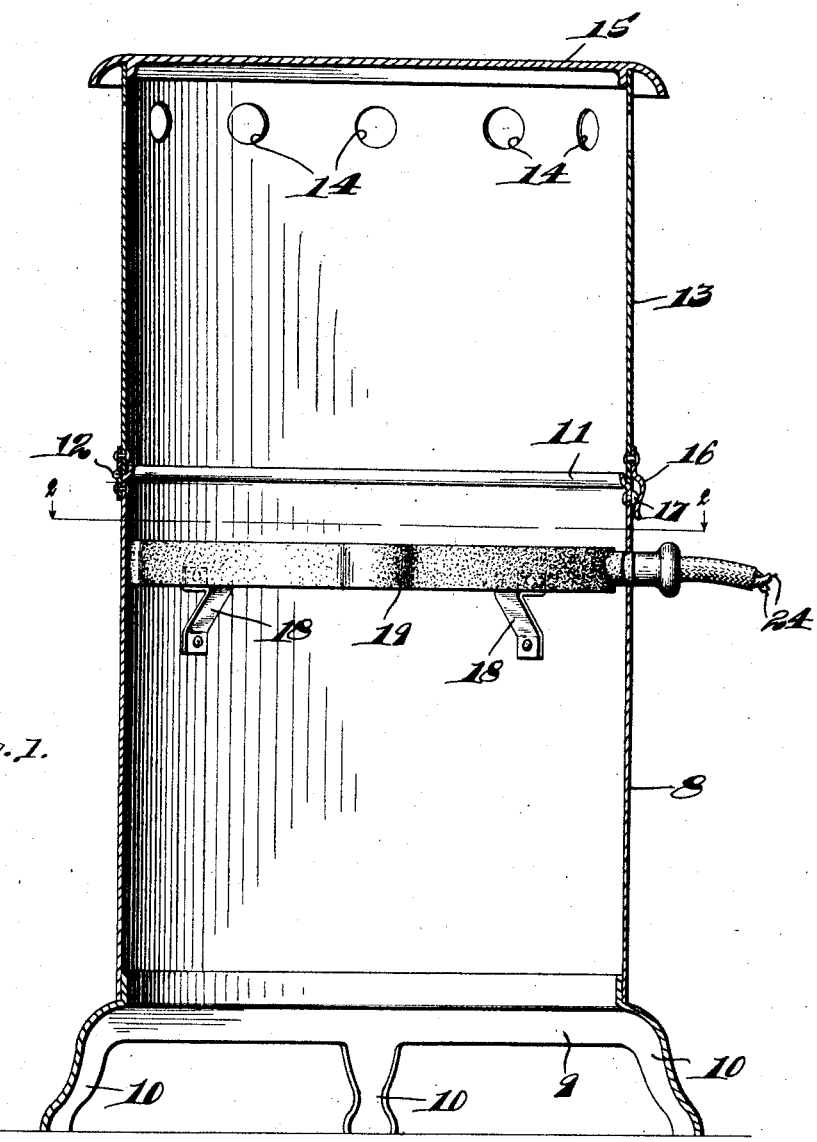

C. L. SKINNER.
ELECTRIC STOVE.
APPLICATION FILED DEC. 8, 1919.

1,359,757.

Patented Nov. 23, 1920.
2 SHEETS—SHEET 1.

Witnesses:
C. E. Wessels
Thos. Donnelly

Inventor:
Charles Leonard Skinner,
By Joshua R. H. Potts
his Attorney.

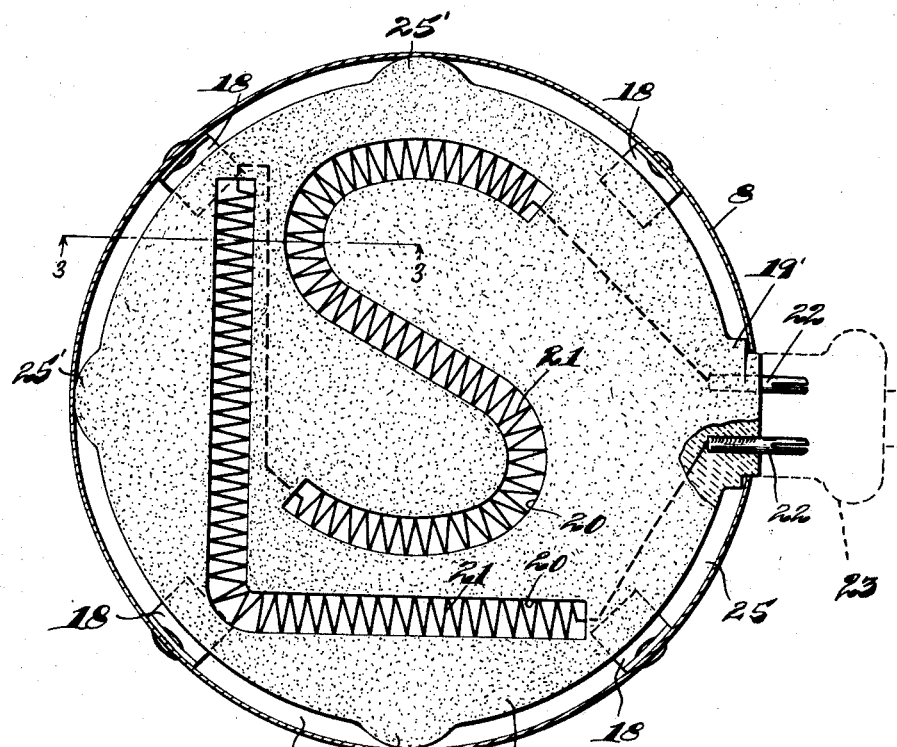
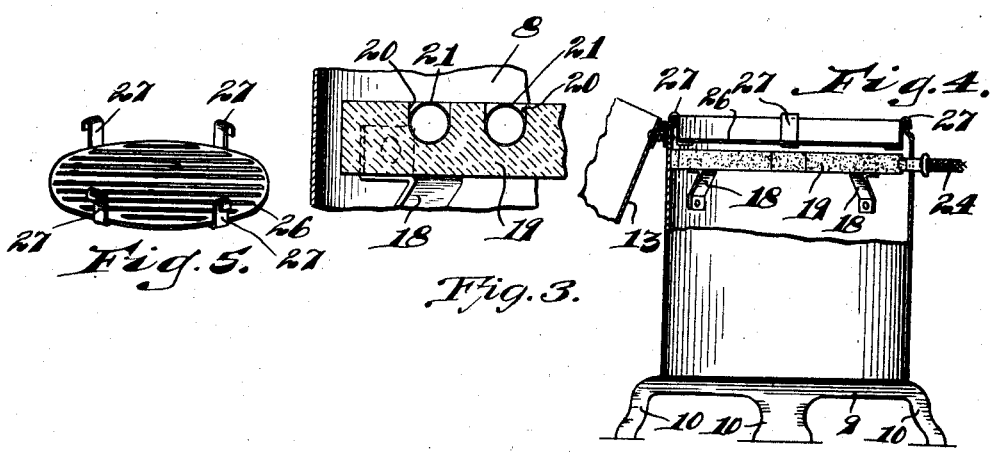

UNITED STATES PATENT OFFICE.

CHARLES LEONARD SKINNER, OF CHICAGO, ILLINOIS.

ELECTRIC STOVE.

1,359,757.   Specification of Letters Patent.   Patented Nov. 23, 1920.

Application filed December 8, 1919. Serial No. 343,185.

*To all whom it may concern:*

Be it known that I, CHARLES LEONARD SKINNER, a citizen of the United States, and a resident of the city of Chicago, county of Cook, and State of Illinois, have invented certain new and useful Improvements in Electric Stoves, of which the following is a specification.

My invention relates to new and useful improvements in electric stoves, and has for its object the provision in an electric stove of a heating element and a supporting member therefor, which may be quickly and easily removed.

Another object is the provision in an electric stove of means for mounting the heating element therein, so as to preserve the same from contact with the flowing air.

Other objects will appear hereinafter.

The invention consists in the combinations and arrangements of parts hereinafter described and claimed.

The invention will be best understood by reference to the accompanying drawings forming a part of this specification, and in which, Figure 1, is a central vertical sectional view of my invention, Fig. 2, is a sectional view taken on substantially line 2—2 of Fig. 1, Fig. 3, is a sectional view taken on substantially line 3—3 of Fig. 2, Fig. 4, is a fragmentary sectional view illustrating a grate used with my invention, and Fig. 5, is a perspective view of the grate used in my invention.

The approved form of construction comprises a casing 8 preferably formed cylindrical and mounted upon a circular base 9, which is supported by suitable legs 10. The casing 8 is provided at its upper end with an inwardly projecting and inclined flange 11. Hingedly connected to the upper end of the casing 8 is a casing 13. The construction is such that the member 13 when hingedly connected at 12 constitutes a continuation of the casing 8. Formed in the member 13, adjacent the upper end thereof and circumferentially arranged and spaced apart are perforations 14. Rigidly mounted upon the upper end of the member 13 is a perforated top 15, which is preferably formed from some cast metal. The perforations formed in the member 15 and in the member 13 offer a means of escape for the radiated air which passes upwardly through the casing 8 and through the casing 13. Mounted upon the member 13, adjacent one end is a clasp 16, which is adapted to engage against an outwardly projecting member 17, which is mounted upon the member 8 adjacent its upper end, the members 16 and 17 serving to latch the members 13 and 8 in the position shown in Fig. 1. Mounted upon the member 8 on the inner side thereof by rivets or other suitable means are brackets 18, which serve to support a disk 19, which is formed from some non-conducting material, preferably from asbestos. The member 19 is provided on its upper surface with grooves 20, which are semi-circular in cross section, the grooves themselves being semi-cylindrical. Positioned in the grooves 20 is a heating element 21 which comprises a wire coiled in the usual manner. The coil which constitutes the heating element 21 is so constructed that when inserted in the grovoe 20, there is a snug fit. Consequently when the current is turned on and the heating element is caused to expand, the heating element is firmly held within the groove 20. Each end of the heating element is connected to a terminal 22, which projects exteriorly of the casing 8. As clearly seen in Fig. 1, the member 19 is provided with a projecting member 19' which is adapted to seat in the opening provided in the member 8, so that the members 22 are prevented from coming into contact with the member 8 and are insulated therefrom. The members 22 are so constructed that a plug switch 23 of the usual type may be inserted thereupon, said plug switch 23 being connected by the wire 24 with a suitable source of electrical energy.

As clearly seen in Fig. 2, the supporting member 19 is so positioned upon the brackets 18 as to provide a space 25 extending around the periphery thereof, said space 25 being interrupted only at intervals by the bulging members 25' and the member 19' which serve to prevent the member 19 from shifting within the casing. The casing 8 is formed open at its base to permit the entry of air therein. Upon the current being turned on, the heating element heats the air above it and thereby the current of air is set up from the base of the casing 8 which is forced through the space 25 and passes upwardly through the perforations formed in the casing 13 and in the member 15. In this manner the radiation is carried on and the heating element is free from contact with the current of air which is set up. Due to the fact that the heating element is free from contact with this current of air, a more constant heat is produced and it has been found by experiment that the life of the heating element is materially prolonged by guarding the same so as to be free from contact with the current of air already mentioned.

By forming the casing proper which constitutes the members 8 and 13 in the manner already described, that is with a swingingly connected hood, the member 19 is readily accessible and the heating element together with its supporting member 19 may be easily and quickly removed and a new heating element inserted therein. Also the stove may be used for heating different objects by swinging the member 13 backward and positioning the object upon the upper edge of the member 8. In order to protect the heating element from contact with any of the objects which it may be desired to heat, I have provided a grate 26 projecting upwardly from which are hooks 27 adapted to engage over the upper edge of the member 8 as will be readily understood.

While I have illustrated the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. An electric stove comprising a casing; a casing hingedly connected to the upper end of said casing; a supporting member mounted adjacent the upper end of said first mentioned casing, and spaced from the walls thereof; and a heating element disposed on said supporting member, substantially as described.

2. An electric stove comprising a casing; brackets mounted on the inner side of said casing; an additional casing hingedly mounted to the upper end of said casing; a supporting member positioned on said brackets; and an electric heating element disposed on said supporting member, substantially as described.

3. An electric stove comprising a casing; a supporting member loosely mounted in said casing; a heating element positioned upon said supporting member; terminals connected with said heating element and projecting through an orifice in said casing; and a hood swingingly mounted upon said casing adjacent the upper end thereof, said hood having perforations formed adjacent its upper end, substantially as described.

4. An electric stove comprising a casing; brackets mounted upon the inner side of said casing; a supporting member loosely positioned upon said brackets; a heating element positioned upon said supporting member; terminals connected with said heating element and projecting through one side of said casing; and a hood swingingly mounted on said casing adjacent the upper end thereof, said hood having perforations adjacent its upper end, substantially as described.

5. An electric stove comprising a sectional circular casing; the sections being hingedly connected together; base member having air ports therein attached to said sectional casing; brackets fixed to the inner side of the lower section of said casing; a heating element seated on said brackets and spaced from the sides of said casing, substantially as described.

6. An electric stove comprising a sectional circular casing; the sections being hingedly connected together, base member having air ports therein attached to said sectional casing; brackets fixed to the inner side of the lower section of said casing; a circular heating member having outstanding lugs on its outer periphery, said heating member being adapted to seat upon the brackets and be held spaced from the side of the casing by means of said lugs; and orifices in the upper section of said casing adjacent its upper edge; and a cover mounted over the open end of said casing, substantially as described.

7. An electric stove comprising a sectional circular casing; the sections being hingedly connected together; base member having air ports therein attached to said sectional casing; brackets fixed to the inner side of the lower section of said casing; a circular heating member having outstanding lugs on its outer periphery, said heating member being adapted to seat upon the brackets and be held spaced from the side of the casing by means of said lugs; a removable grate positioned over said heating member; and orifices in the upper section of said casing adjacent its upper edges; and a cover mounted over the open end of said casing, substantially as described.

In testimony whereof I have signed my name to this specification in the presence of two subscribing witnesses.

CHARLES LEONARD SKINNER.

Witnesses:
  JOSHUA R. H. POTTS,
  B. G. RICHARDS.